Jan. 26, 1971     H. M. WILSON     3,558,462
PROBE ASSEMBLY FOR CORROSION TESTS
Filed Oct. 3, 1968     2 Sheets-Sheet 1
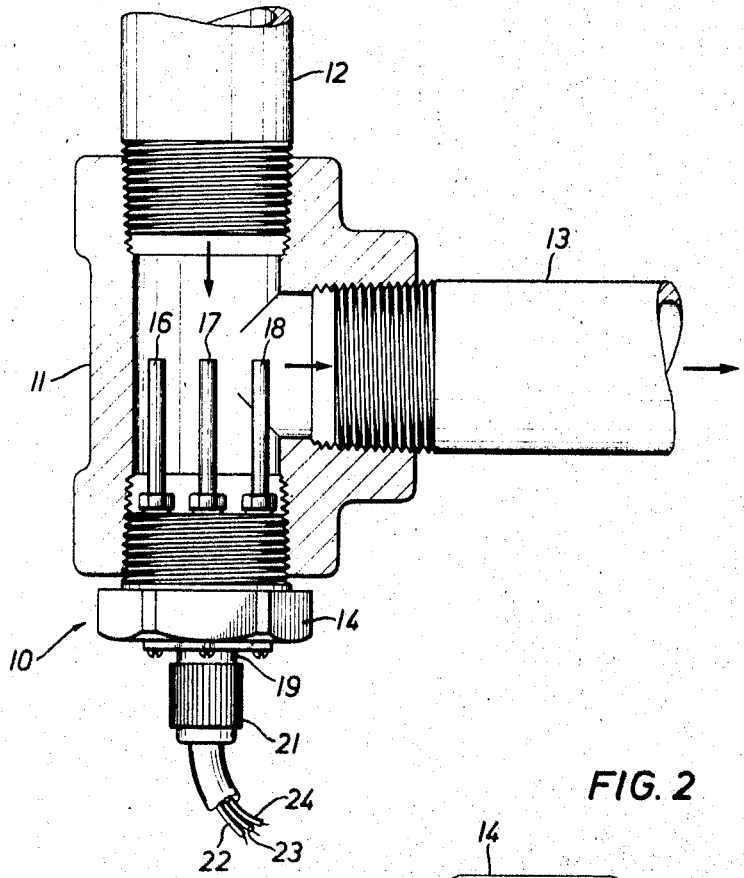
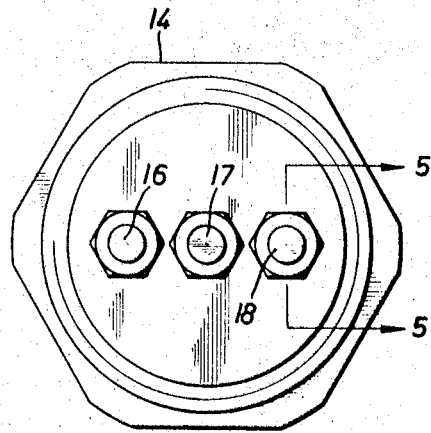
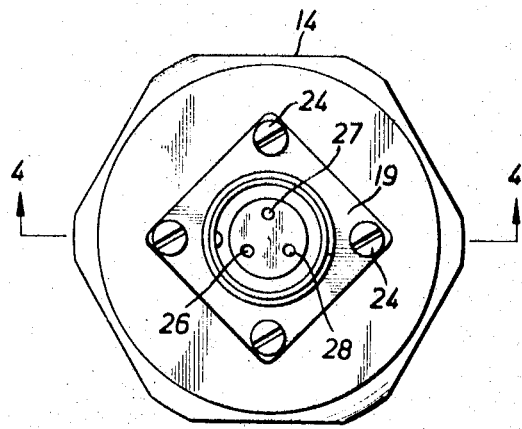
Homer M. Wilson
INVENTOR
BY *Emil J. Bednar*
ATTORNEY United States Patent Office 3,558,462
Patented Jan. 26, 1971

3,558,462
PROBE ASSEMBLY FOR CORROSION TESTS
Homer M. Wilson, Houston, Tex., assignor to Petrolite Corporation, St. Louis, Mo., a corporation of Delaware
Filed Oct. 3, 1968, Ser. No. 764,884
Int. Cl. G01n 27/46
U.S. Cl. 204—195
7 Claims

ABSTRACT OF THE DISCLOSURE

This specification discloses a metallic test probe assembly having a body containing a plurality of passageways which carry insulating members with glass elements. Metallic terminal pins extend through the glass elements and mount field replaceable identical metallic electrodes in side-by-side relationship. Insulating fluid seals are engaged in fluid tightness between the end surfaces of the glass elements and the electrodes. Electrically conductive means interconnect the pins to form circuits through the electrodes during polarization measurements. The conductive means are insulated from one another and the test probe body. The probe assembly may be readily installed in any piping system carrying corrosive fluids without introducing any weakness into such piping. The probe assembly does not require a recalibration of measuring facilities after electrode replacement.

BACKGROUND OF THE INVENTION

(1) Field of the invention

This invention relates to measuring and testing of corrosion processes, and it relates more particularly to the instruments and electro-chemical techniques used in the study of corrosion processes.

(2) Description of the prior art

It is often desirable to determine the rates at which metals corrode within a corrosive liquid. For example, corrosion inhibitors are added to aqueous liquids to reduce the corrosion of exposed metals. Instruments are used to measure the rates at which these metals corrode so that the effectiveness of the inhibitor can be determined. The measurement of the rate of corrosion upon metals usually involves an instrument associated with a probe which carries a plurality of electrodes immersed within the corrosive liquid. In refineries, petrochemical plants, and other process industries using large volumes of aqueous fluids, the probes are usually installed within the piping system carrying the fluid desired to be monitored. Additionally, probes have been placed in other uses, such as in monitoring the rate of corrosion of metals forming oil field pipelines containing waters that are employed to stimulate oil production from subterranean reservoirs.

The probes must be readily interconnected into the piping system carrying aqueous fluids so that their electrodes are exposed to the corrodant. Whatever the construction of the probes, their placement into the piping must not create a weakness. For example, probes using plastics for providing insulating functions are not universally acceptable. One reason for this result is the chemical and physical attack in certain aqueous systems upon various plastic materials. The probe may be subject to aqueous systems containing various corrodants and plastic destroying organic contaminants at pressures up to 15,000 p.s.i. and temperatures which can reach 400° F. Under these operating conditions, the probe must not introduce a weakness due to its construction into the piping system. A failure of the probe, by leakage or blowout, can cause a severe economic loss when the piping system provides an essential processing link. Under these circumstances, the entire process must be temporarily interrupted while the probe is being replaced.

In many instances, the probe will be installed within a "bypass" piping circuit so that it can be readily removed. This arrangement permits the field replacement of its electrodes. The field replacement of electrodes in a probe is a great advantage. The probes' electrodes may be replaced to eliminate effects of previous corrosion or exposure to inhibitors. Additionally, the electrodes may be examined to measure the actual weight loss suffered during exposure to the corrosive aqueous medium. However, the exact same surface area exposure must be maintained between electrodes interchanged on the probe. Otherwise, the probe assembly must be recalibrated to insure consistent results in the measurement technique after each replacement of the electrodes. The electrodes will be changed in the field, usually by non-tchnical personnel. Therefore, the changing of the electrodes cannot require sophisticated measurement or replacement techniques. For example, the exposed surface areas of the electrodes cannot depend upon making a certain measured engagement relative to a mounting or sealing surface.

In addition, the probe assembly itself must not require special handling, placement or tools not normally required in maintaining the piping system. Preferably, the probe assembly looks and is handled like a regular pipe fitting. The probe assembly should not contain any material (other than possibly the electrodes) which is more corrodible in the aqueous fluid than the piping system. Thus, the probe cannot be the weakest link in the piping system.

The probe assembly usually employs a plurality of electrodes which are insulated from one another and the pipe system. Generally, the electrodes are metals and have identical surface areas exposed to the corrodant. The electrodes in a corrosive liquid undergo certain electro-chemical changes that are related to rates of corrosion of the specfic metals. Thus, the rate of corrosion can be correlated with the electro-chemical effects upon the metallic electrodes of a probe assembly immersed in the corrosive liquid.

An electro-chemical process and apparatus especially useful in measuring corrosion rates is described in application Ser. No. 332,399 which was filed Dec. 23, 1963 and now is U.S. 3,406,101. In this technique, there is employed a corrosion rate meter which includes a probe having three electrodes adapted to be exposed to a corrosive liquid, an adjustable current source, an ammeter and a high impedance volt meter as primary components. The adjustable current source applies a small electric current between a "test" electrode and an "auxiliary" electrode. At the same time, the volt meter monitors the polarization potential between the "test" electrode and a "reference" electrode. The current flow slightly polarizes the surface of the "test" electrode, and as a result, causes a shift in the potential between the "test" and "reference" electrodes. The current flow required to produce 10 millivolts polarization is directly proportional to the corrosion rate of the "test" electrode undergoing corrosion.

If the corrosion rate is low, a very small current flow will polarize the "test" electrode. If the corrosion rate is high, much more current flow is required to polarize the electrode. The weight of metal loss from the electrode (by electro-chemical corrosion) is directly proportional to the current flow in accordance with Faraday's Law. Thus, by use of appropriate constants and adjustment of the exposed surface area of the "test" electrode, the ammeter can be calibrated directly into any desired units of corrosion rate providing the surface area of the "test" electrode is kept constant.

Obviously, the initial surface area of the electrode exposed to the corrosive liquid can be adjusted into the desired range. In order to provide symmetry of the probe, and for other reasons, the exposed surface areas of all electrodes are made identical. Thus, if the electrodes are constructed of the same material, such as 1020 mild steel, any of the electrodes may serve as the "auxiliary," "test" and "reference" type electrode in electro-chemical techniques for determining the rate of corrosion.

Although the probe can be manufactured with certain identical exposed surface areas of the electrodes, the corrosive liquid causes the exposed surfaces to become pitted and otherwise damaged. Eventually, the probe must be either discarded, or the electro-chemical technique recalibrated for the new characteristics which the electrodes have assumed. Usually the latter occurrence is avoided by substituting a new probe or replacing the electrodes. The probe can be removed and the electrodes refinished to provide a clean, fresh surface exposed to the corrosive liquid. However, the electrodes now will have a different exposed surface area than for which the probe was originally calibrated. Thus, a recalibration is required to maintain the ammeter of the corrosion meter calibrated directly in units of the corrosion rate.

It is the purpose of this invention to provide a test probe assembly which can be readily installed in piping systems without introducing a weakness there into or one requiring special piping techniques. Additionally, the electrodes on the probe assembly can be readily replaced by non-technical personnel without requiring recalibration of the corrosion measurement technique. Thus, the corrosion meter used with the probe assembly will maintain its calibration directly in the units of corrosion rate for which is originally calibrated regardless of repeated electrode replacements.

SUMMARY OF THE INVENTION

In accordance with this invention, there is provided a corrosion test probe assembly consisting of body and electrodes, for determining the corrosion rate of a metallic material in an electrolyte by means of polarization measurement. A metallic test probe body is provided with a plurality of parallel passageways in which insulating members having glass elements are secured. Metallic terminal pins are positioned in the passageway and extend in fluid tightness through the insulating members. Separate essentially dimensionally identical metallic electrodes are secured to one end of the pins into side-by-side relationship. Insulating fluid seals encircle the pins and are engaged in fluid tightness between the presented end surfaces of the insulating members and the electrodes. Separate electrically conductive means extend from the other end of the metallic pins. These conductive means form circuits through the electrode during polarization measurements. The conductive means are insulated from each other and the test probe body.

In other aspects, the body and the electrodes each form novel structures and articles of manufacture having utility separately or in conjunction with one another.

BRIEF DESCRIPTION OF THE DRAWINGS

FIG. 1 is a prospective view, partially in cross section, of the probe assembly of this invention installed within a Tee of a conventional piping system.

FIG. 2 is an enlarged bottom (fluid-side) view of the probe assembly shown in FIG. 1;

FIG. 3 is an enlarged top (atmospheric-side) view of the probe assembly shown in FIG. 1;

DESCRIPTION OF SPECIFIC EMBODIMENTS

Figure 4:
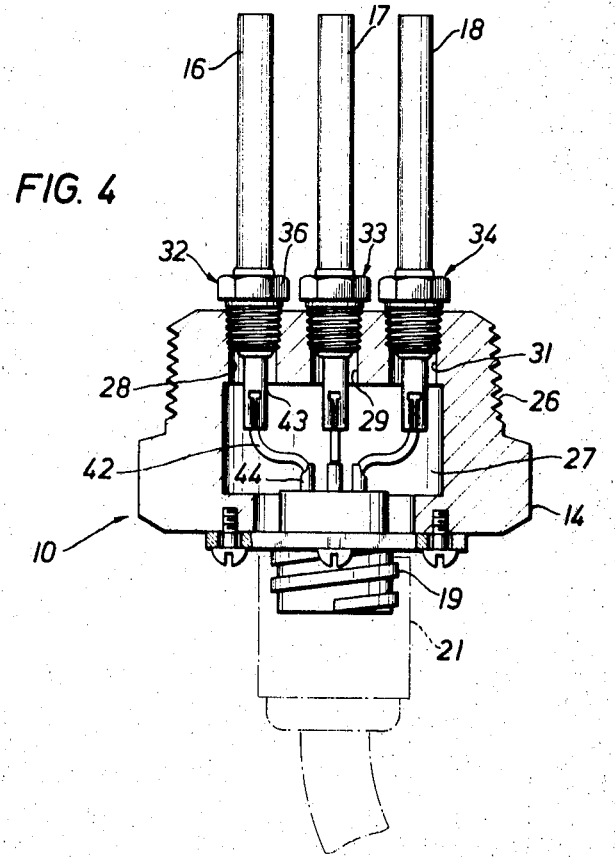
FIG. 4 is an enlarged view, partially in cross-section, taken along line 4—4 of the probe assembly shown in FIG. 3.

In FIG. 1, there is illustrated one embodiment of a corrosion test probe assembly 10 which is secured within a Tee 11 forming an interconnection between pipes 12 and 13 in a piping system carrying aqueous fluids whose corrosive effect is desired to be determined. The piping system dimensions are uncritical to the present invention, but for illustration, the pipes 12 and 13 may be of 2" internal diameter. The aqueous fluids flow through the piping system in a direction shown by the arrows. The probe assembly 10 is comprised of a metallic body 14 on which are carried replaceable electrodes 16, 17 and 18. These electrodes are interconnected within the body 14 by insulated electrically conductive means to a multi-connector electric fitting 19 carried on top of the body 14. Electrical connection to a corrosion rate meter (not shown) is by a cable connector 21 interconnecting conductors 22, 23 and 24 to the electrodes 16, 17 and 18, respectively, of the probe assembly 10.

The probe assembly 10 can be constructed of any suitable form so that it can be readily secured to the piping system carrying the aqueous fluids to be monitored. Preferably, the body 14 is constructed from a metallic pipe plug compatible with the piping system. Thus, the top portion of the body 14 has a polygonal configuration and a lower cylindrical portion having a threaded exterior side surface.

Referring to FIG. 2, the electrodes 16, 17 and 18 extend longitudinally from the bottom of the body 14 in side-by-side relationship. It is preferred for better measurements, to mount the electrodes diametrically aligned along the bottom of the body 14 rather than in a triangular or other relationship where electrical coaction between the electrodes occurs in the corrodant.

Referring to FIG. 3, the multi-pin fitting 19 is secured by means of screws 24 to the top of the body 14. The electrodes 16, 17 and 18 are electrically connected to the pins 26, 27 and 28, respectively, in the fitting 19. There are no exposed electrical connections between the electrodes and the fitting 19. As a result, the probe assembly 10 can be handled as another pipe fitting during installation.

The construction of the probe assembly 10 can be seen in greater detail in FIG. 4. The body of 14 carries external threads 26 which are adapted to interengage with the interior threads in the T 11. A cavity 27, preferably cylindrical, is provided from the top of the body 14 to a region adjacent the lower cylindrical portion carrying the threads 26. The configuration of the cavity 27 is unimportant other than in providing sufficient room in which to accommodate the electrical connections between the electrodes and the fitting 19. The lower portion of the body 14 is provided with a plurality of paralleled passageways 28, 29 and 31. The passageways are threaded, at least in part, to receive insulating members 32, 33 and 34 to which the electrodes are secured. Since the insulating members are identical, only insulating member 32 will be described in detail.

Figure 5:
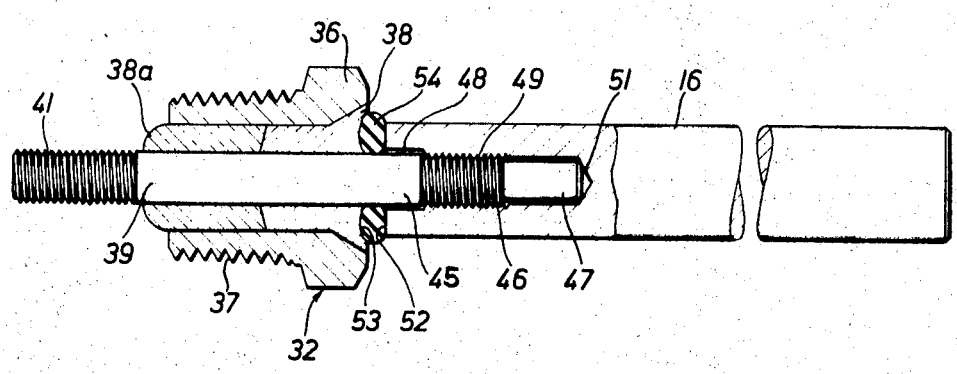
FIG. 5 is an enlarged view partially in cross-section taken alone line 5—5 of one electrode and associated elements of the probe assembly shown in FIG. 2.

The insulating member 32, as seen in FIGS. 4 and 5, is provided by an exteriorly threaded metallic sleeve 36 which carries threads 37 to interengage with the threads in the passageway 28. The sleeve 36 may carry a polygonal external surface that is readily engaged by various pipe tools as can be best seen by momentary reference to FIG. 2. A glass element 38 is secured against displacement by compression and a flared shoulder within the sleeve 36. A metallic pin 39, extends centrally of the insulating member 32 and in fluid tightness through the glass element 38. The glass element 38, sleeve 36 and pin 39 are sealed in fluid tightness by fusion. Thus, the glass element 38, pin 39 and sleeve 36 are formed with glass-to-metal seals. The end of the pin 39 within the cavity 27 is provided with a thread 41, or other attaching surface, onto which electrical connection may be made. More particularly, electrical conductor 42 is secured to the threads 41 by terminal clip 43. The other end of the conductor 42 is secured to a terminal lug 44 which is electrically common to the pin 26 of the fitting 19. The electrical connections between the electrodes 17 and 18 through the insulating members 33 and 34 are made in identical manner.

The electrode 16 is releasedly secured to the pin 39 in any convenient manner. Preferably, the interconnection is by threads so arranged that a positive electrical and mechanical connection is made while also providing a fluid-tight seal between the electrode 16 and the glass element 38. For this purpose, the pin 39 is cylindrical with a full diameter portion 45 adjacent the glass element 38, an intermediate threaded portion 46 and a reduced diameter portion 47. The electrode 16 has an axial bore 48 formed into one of its ends which carries a seal engaging surface. The bore 48 has a reduced diameter threaded portion 49 which interengages with the threaded portion 46 of the pin 39. The bottom of the bore 51 has an abutting surface to engage a complementary surface upon the end of the reduced diameter portion 47 of the pin 39. Thus, the electrode 16 is threaded upon the pin 39 until a metal-to-metal contact occurs between the abutting surfaces on the pin 39 and the bore 48 of the electrode 16. A space is provided between the presented faces 52 and 53 of the electrode 16 and the glass element 38, respectively, by the length of the full diameter portion 45 with the electrode 16 and pin 39 in abutting relationship. The space between the presented faces 52 and 53 provides a precise dimension in which to receive an insulating fluid seal 54 into fluid tight engagement. Although any type of fluid seal may be employed, it is preferred to employ an O-ring formed of Viton (trade name). The seal 54 encircles the pin 39 and is compressed within the precise space distance to serve effectively as a pressure seal. The seal 54 keeps certain corrosive fluids from causing bimetallic contact corrosion along the threaded joint between pin 39 and electrode 16. Thus, the electrode 16 does not need to be threadedly adjusted on the pin 39 to place the fluid seal 54 into a certain compression. The metal-to-metal abutment between the pin and electrode, and the precise space thereby provided, create the sealing function.

The electrodes 17 and 18 use identical structures for their mounting upon the insulating means 33 and 34 as has been described for the element 16.

It will readily be seen that the probe assembly 10 may be placed as would an ordinary pipe plug into piping systems without depending upon plastics, or other types of deteriorating seal materials to prevent leakage of corrosive fluids. The arrangement of the insulating member 32 with the glass element 38, provides an excellent fluid seal which is mechanically strong. The hermetic properties of this arrangement depend upon a fusion between the glass element 38, the sleeve 36, and the pin 39, plus a certain control compression created by the differential shrinkage of the sleeve 36 about the glass element 38. The glass element 38 need not extend substantially the depth of the sleeve 36. The glass element 38 may extend only partially into the sleeve 36 with the remaining opening about the pin 39 filled with a glass sleeve 38a which is held in place by a cementitious material. The function of the glass sleeve 38a is merely to fill an opening into which moisture or debris may otherwise accumulate. The upstream placement of the glass element 38 provides the necessary mechanical and electrical functions within the insulating member 32.

In the insulating member 32, the sleeve 36, the glass element 38 and the pin 39 are arranged of suitable materials that have compatible coefficients of expansion and that provide the desired hermetic seal by fusion and compression properties. Additionally, the glass element 38 has significant structural strength, good chemical resistance and excellent electrical properties. The glass element 38 is relatively insensitive to thermal and mechanical disruption. Thus, the probe assembly 10 does not depend on polymeric plastics to provide either mechanical or electrical functions. The glass element 38 is capable of withstanding substantial amounts of fluid pressure under rigorous operating conditions.

The body 14 may be replaced, with or without new electrodes, whenever leakage occurs in any threaded joint.

The electrodes employed with the body 14 are of special utility since they can be readily replaced as often as is desired without changing the accuracy of corrosion rate determinations. Since one end surface of each electrode is always sealed against the seal 54, essentially dimensionally and surface smooth identical metallic electrodes provide substantially identical exterior side surface areas exposed to the aqueous medium. The electrodes are formed by common manufacturing techniques from a cylindrical rod which is given smooth exterior side and imperforate end surfaces. For example, a rough cylindrical rod is machined by turning, boring, and threading into the properly dimensioned electrode. Then, the electrode (with machined-marked surfaces) is provided a satin-like smooth finish by peening with glass beads projected at a high velocity upon the machined surfaces. The peening is sufficiently thorough that the actual and mathematically derived surface areas are substantially identical within the calibrated accuracy of the polarization measurement. Thus, the electrodes may be readily exchanged in the probe assembly 10 without requiring recalibration of the corrosion rate meter with which the probe assembly is associated.

The electrodes especially suited for use in the probe assembly 10 may be constructed of any suitable conductive material. Preferably, the electrodes are fabricated from 1020 mild steel. Although steel has been proved suitable for use as a reference electrode in the present corrosion test probe assembly, the theory of the technique indicates that other materials and metal alloys may be employed. Materials such as iron, aluminum, copper, brass, lead, nickel, titanium, tantalum, zirconium, chromium and alloys thereof may be used under similar conditions. The use of steel is preferred for the electrodes. However, corrosion rates may be determined in a shorter test period at higher temperatures and pressures with the electrodes formed of other materials. Electrodes constructed of the same material are an advantage since all the electrodes respond identically to the corrosive liquid in which the corrosion rate test is being performed.

Various modifications and alterations in the described probe assembly will be apparent to those skilled in the art from the foregoing description which do not depart from the spirit of the invention. For this reason, these changes are desired to be included within the scope of the appended claims. The appended claims define the present invention; the foregoing description is to be employed for setting forth the present embodiments as illustrative and not limitative in nature.

What is claimed is:

1. A corrosion test probe assembly of a body and electrodes suitable for determining the rate of corrosion of a metallic material in a corrodent by means of polarization measurements comprising:
   (a) a metallic body provided with a plurality of paralleled passageways,
   (b) insulating members having glass elements, an insulating member secured within each of said passageways,
   (c) a metallic terminal pin positioned in each of said passageways and extending in fluid tightness through each of said glass elements of said insulating members
   (d) separate essentially dimensionally identical metallic electrodes, one of said electrodes secured to one end of each of said pins,
   (e) an insulating fluid seal mounted on each of said pins and engaged in fluid tightness between presented end surfaces of each of said insulating members and said electrodes, (f) electrically conductive means extending from the other ends of said pins, and (g) means insulating said conductive means from each other and said body whereby said electrically conductive means form circuits through said electrodes during polarization measurements.

2. The probe assembly of claim 1 wherein each said passageway is threaded at least in part and each said insulating member is formed of an exteriorly threaded metallic sleeve surrounding in compression a glass element, one of said sleeves being threadedly secured into each of said passageways, one of said pins extends centrally through each of said glass elements, and said pins, glass elements and sleeves are sealed into fluid tightness by fusion.

3. The probe assembly of claim 1 wherein one end of each of said electrodes and said pins is threaded, one of said electrodes being threadedly secured to each of said pins in metal-to-metal abutment, and the presented end surface of each of said electrodes and insulating members in abutting relationship being spaced apart a precise distance to receive said fluid seal with fluid tight engagement.

4. The probe assembly of claim 1 wherein each of said pins is cylindrical and carries a full diameter portion adjacent each said insulating member, an intermediate threaded portion, and a reduced diameter end portion having an end abutting surface; each of said electrodes provided at one end with an axial bore to receive one of said pins and carrying an intermediate threaded portion whereby each of said electrodes is threadedly secured to one of said pins with said end abutting surface of said reduced diameter portion of each said pin engaging in metal-to-metal contact the bottom of said bore of one of said electrodes; and said full diameter portion of each of said pins having a length sufficient to space the presented end surfaces of each of said electrodes and pins in abutting relationship a precise distance to receive said fluid seal with fluid tight engagement.

5. The probe assembly of claim 1 wherein each said passageway is threaded at least in part and each said insulating member is formed of an exteriorly threaded sleeve surrounding in compression a fused glass element, each said sleeve being threadedly secured into one of said passageways, and each of said pins extends in fluid tightness centrally through one of said glass elements, each of said pins is cylindrical and carries a full diameter portion adjacent each said glass element and an intermediate threaded portion, and a reduced diameter end portion having an abutting surface; each of said electrodes is cylindrical and is provided at one end with an axial bore to receive one of said pins and carrying an intermediate threaded portion whereby said electrodes are threadedly secured to said pins with the end abutting surface of said reduced diameter portion of each of said pins engaging in metal-to-metal contact the bottom of said bore of one of said electrodes, and said full diameter portion of each of said pins having a length sufficient to space the presented end surfaces of each said glass element and said electrode in abutting relationship a precise distance to receive said fluid seal with fluid tight engagement.

6. The probe assembly of claim 1 wherein said test probe body is provided with a top portion having a polygonal configuration and a lower cylindrical portion having a threaded exterior side surface, said body having formed therein a cylindrical cavity extending from the top portion to adjacent the lower portion of said body, each of said passageways being provided through the lower portion of said body into communication with said cavity, and each of said terminal pins extending from the lower portion of said body and toward said cavity from each of said insulating members secured in said passageways.

7. The probe assembly of claim 6 wherein a multiconnector electrical fitting is secured to the top portion of said body for enclosing said cavity, and said electrical conductive means interconnect between said fitting and the ends of said pins adjacent said cavity.

References Cited

UNITED STATES PATENTS

| | | | |
|---|---|---|---|
| 1,456,110 | 5/1923 | Mackay | 174—152.4 |
| 2,078,776 | 4/1937 | Ruggles | 174—152.4 |
| 2,136,052 | 11/1938 | Hurley | 174—152.4 |
| 2,898,395 | 8/1959 | Schurecht | 174—152.4 |
| 2,949,417 | 8/1960 | Preiser et al. | 204—286 |
| 3,406,101 | 10/1968 | Kilpatrick | 204—195 |
| 3,491,012 | 1/1970 | Winslow | 204—195 |

TA HSUNG TUNG, Primary Examiner

U.S. Cl. X.R.

204—1, 286, 297; 324—29, 71